Sept. 6, 1949.  C. W. BROWN  2,481,469
REFRIGERATING SYSTEM
Filed July 31, 1947  2 Sheets-Sheet 1
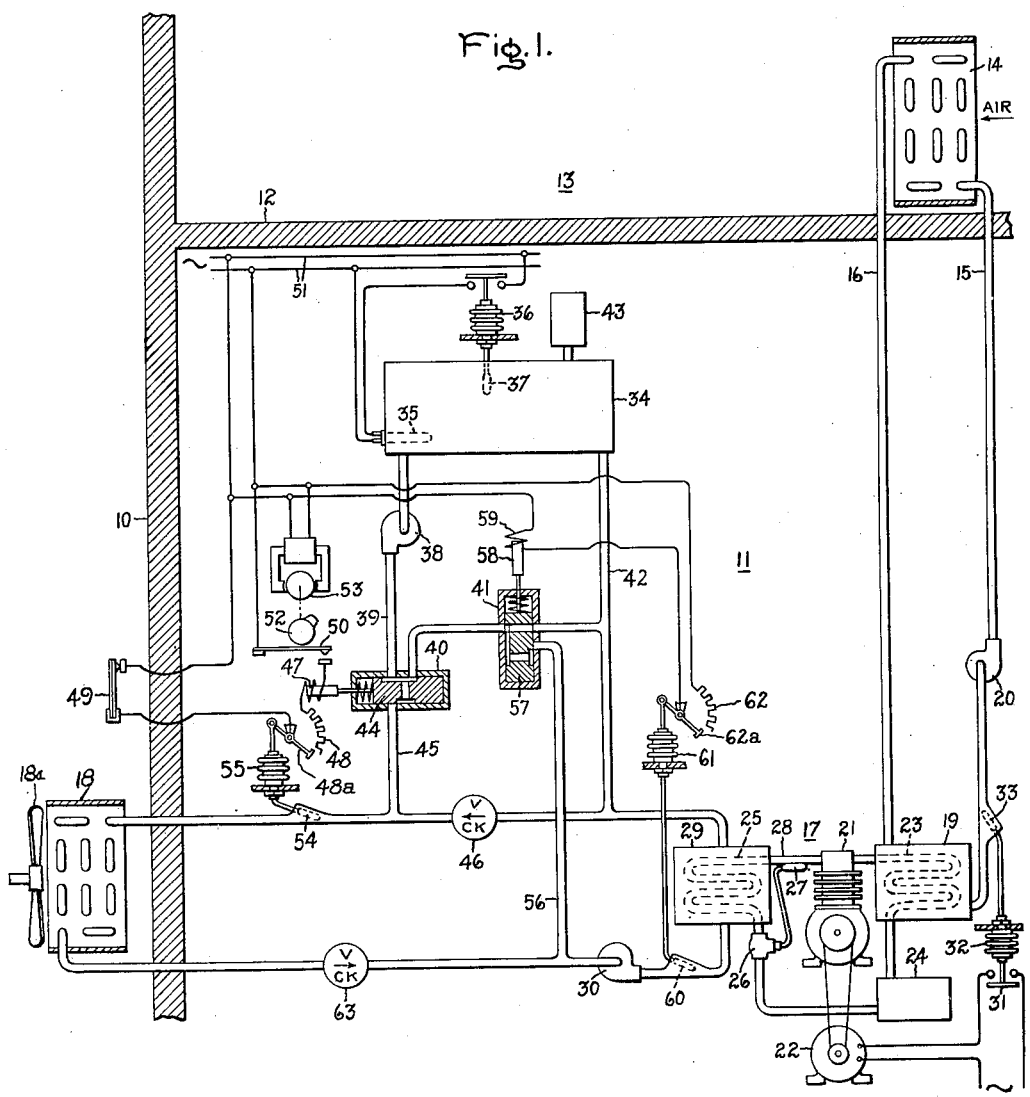
Inventor:
Coy W. Brown,
by Edwin L. Rich
His Attorney

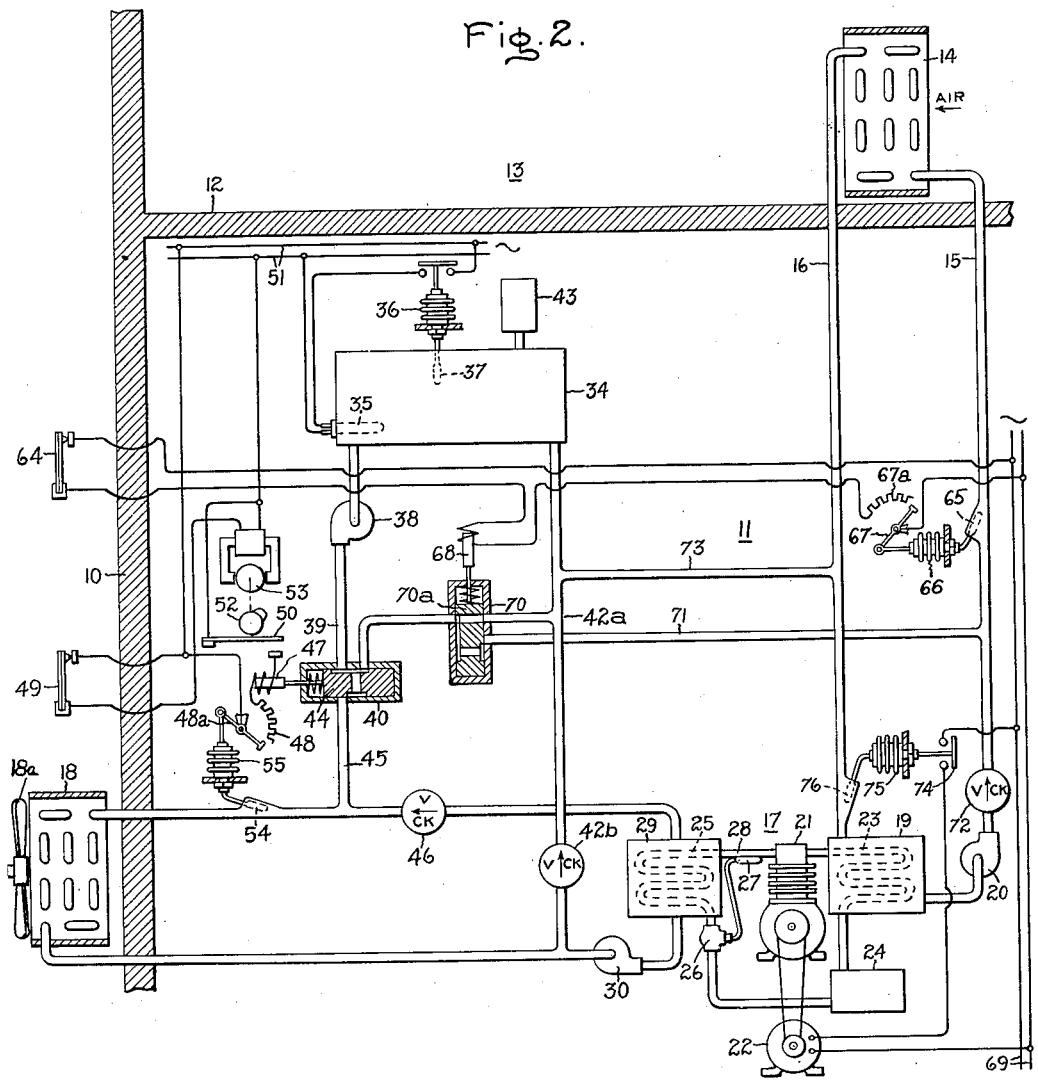

Patented Sept. 6, 1949

2,481,469

UNITED STATES PATENT OFFICE 2,481,469

REFRIGERATING SYSTEM

Coy W. Brown, Roseland, N. J., assignor to General Electric Company, a corporation of New York Application July 31, 1947, Serial No. 765,117

10 Claims. (Cl. 62—2)

1

My invention relates to refrigerating systems and particularly to reversed cycle refrigerating machines or heat pumps provided with heat storage and defrosting equipment.

When a refrigerating system is employed as a heat pump, it is sometimes desirable to use as a source of heat either the outdoor air or river or lake water, which may vary in temperature over a relatively wide range. As the temperature of the medium from which the evaporator abstracts heat becomes lower, the coefficient of performance of the refrigerating machine decreases rapidly. Heat pumps employed for heating purposes in the winter thus operate at the lowest coefficient of performance when the requirements are most severe; thus when the outdoor air temperature is low and heating requirements are correspondingly high, the refrigerating machine operates at a low coefficient of performance. The amount of heat which can be extracted from the outdoor air, of course, depends upon the difference in temperature which can be maintained between the evaporator of the refrigerating machine and the air, it being necessary for the evaporator to operate at a substantially lower temperature than the air. In the case of lakes or streams it is, of course, necessary for the rate of flow of the water to be such that the formation of ice and clogging of the heat exchanger will not result, and consequently the operation of such systems is limited. In both situations it is desirable to provide an additional source of heat to meet the peak requirements during extremely adverse weather, and heat storage tanks have been employed for this purpose to provide standby capacity. When the outside atmosphere is employed as a source of heat, frost may collect on the outdoor heat exchanger and the defrosting of the surfaces of the exchanger becomes necessary in order to maintain the capacity of the refrigerating machine. Various arrangements have been provided for effecting the defrosting of the evaporator or other heat transfer surface in the outdoor air stream. For the most part, however, these defrosting systems have required that the operation of the refrigerating machine be interrupted during the defrosting process. Accordingly it is an object of my invention to provide a refrigerating system having a cooling unit for abstracting heat from air and including an improved arrangement for defrosting the cooling unit without the necessity of interrupting the operation of the system.

It is another object of my invention to provide a reversed cycle refrigeraing system utilizing a source of heat which varies over a wide range of

2 temperatures and including an improved arrangement for employing a heat storage reservoir to supply additional heat under adverse conditions when the temperature of the heat source is low.

It is another object of my invention to provide a reversed cycle refrigerating system for supplying heat and arranged to utilize the outdoor atmosphere as a source of heat and including an improved arrangement for utilizing a heat storage reservoir for defrosting purposes and for supplying heat to the system when the temperature of the air is low.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawings in which Fig. 1 is a diagrammatic view of a heating system including a reversed cycle refrigerating machine embodying my invention, and Fig. 2 is a diagrammatic illustration of a heating system employing another embodiment of my invention.

Referring now to Fig. 1, a building having an outside wall 10 is provided with a machinery room 11 on one side of a floor or partition 12 and a room 13 on the other side thereof. The air in the room 13 is warmed by circulation over a heat transfer unit 14 supplied with hot heat transfer liquid through an inlet conduit 15 which is returned to the source through an outlet conduit 16. The source of heated liquid is a reversed cycle refrigerating machine 17 arranged to pump heat from an outdoor heat exchanger 18 to a heat exchanger 19 arranged in a closed liquid circuit including the inlet conduit 15 and outlet conduit 16 connected to the unit 14. The circulation of liquid between the units 14 and 19 is effected by operation of a pump 20 which may be controlled, for example, in accordance with the temperature in the room 13.

The reversed cycle refrigerating machine 17 includes a compressor 21 driven by an electric motor 22, a condenser 23 arranged within the heat exchange unit 19, a liquid refrigerant receiver 24, and an evaporator 25 to which liquid refrigerant is supplied from the receiver under control of a thermostatic expansion valve 26. The valve 26 includes a conventional temperature responsive bulb 27 in heat exchange with the suction line 28 between the evaporator 25 and the intake of the compressor 21. In order to supply heat to liquid refrigerant in the evaporator 25, the evaporator is arranged in a heat transfer unit 29 through which brine or other suitable heat transfer liquid is circulated by a pump 30 from the heat exchanger 18 through the unit 29 and back to the heat exchanger. Thus air circulated over the outdoor heat transfer unit 18 by a suitable fan supplies heat to the liquid circulating in the heat exchanger, and this heat is given up to the evaporator 25 and is pumped by operation of the refrigerating machine 17 to the heat transfer unit 19 where it is available for heating the air in the room 13. The pump 20 may by operated by suitable driving and control apparatus (not shown) so that it circulates hot liquid to the heat exchanger 14 whenever there is a demand for heating of the air in the room 13 or the air supplied to room 13. The motor 22 for driving the compressor 21 may be operated either independently or concurrently with the pump 20 by any suitable control (not shown). In order to limit the temperature of the circulated heat transfer liquid a normally closed switch 31 is provided in the motor circuit; this switch is opened by a bellows 32 whenever the temperature of the liquid circulated through the heat exchange unit 19 rises above a predetermined value, as indicated by a temperature feeler bulb 33 arranged in the liquid circuit at the outlet of the unit 19.

During the operation of the heating system, frost tends to collect on the surface of the heat exchanger 18, and when a substantial amount of frost has collected it becomes necessary to remove this coating in order to maintain the required capacity of the heat exchanger. In the system illustrated the defrosting of the unit 18 is accomplished by circulating therethrough liquid heated sufficiently to melt any ice on the surface of the heat exchanger. The hot liquid for defrosting is obtained from a heat storage tank or reservoir 34 heated by an electric heating coil 35 controlled by a thermostatic switch 36 having a feeler bulb 37 responsive to the temperature of the liquid in the tank. A pump 38 is provided to circulate liquid from the tank through a conduit 39, valves 40 and 41, and back to the tank through a conduit 42. The pump 38 may be operated continuously to provide agitation of the liquid in the tank 34, or it may be operated only upon a demand for a supply of hot liquid to the system. When operated continuously the pump 38 serves to maintain uniform temperature of the liquid in the tank 34 by providing continuous agitation. A tank 43 is connected to the tank 34 above the top thereof and acts as an expansion tank to maintain the system filled with liquid. Upon a call for defrosting, a member 44 of the valve 40 is shifted to the left to cut off communication with the valve 41 and connect the pump 38 through a conduit 45 in communication with the fluid circuit of the heat exchanger 18, thereby admitting hot fluid from the tank to the heat exchanger, the return fluid flowing through the pump 30 and heat exchanger 29 to the conduit 42 and back to the tank 34. A check valve 46 prevents flow of hot fluid from the conduit 45 directly to the unit 29. The flow of hot liquid through the heat exchanger 18 heats the surface thereof and frost or ice is melted. Any additional heat in the liquid circulated by the pump 30 is delivered to the heat exchanger 29 where it may be absorbed by the evaporator 25.

The control for initiating the defrosting operation includes a solenoid 47 for shifting the member 44 of the valve 40 and which is arranged to be connected in an electric circuit including a variable resistance 48, a thermostatic switch 49 arranged in the outside air, and a periodically actuated switch 50. When the switches 49 and 50 are closed the solenoid 47 is connected to be energized from supply lines 51 provided a contact arm 48a is in engagement with the resistance 48. The switch 50 is closed periodically by rotation of a cam 52 driven continuously by a motor 53. This switch closes the defrosting circuit at timed intervals during any period when the outdoor temperature is sufficiently low to close the switch 49, this switch being open at temperatures above the predetermined temperature at which defrosting becomes necessary. The liquid supplied to the heat exchanger 18 during the defrosting operation is a mixture of hot liquid from the storage tank 34 and cooled liquid delivered from the tank 29. Should the temperature of the mixture increase above a predetermined value, as determined by a temperature responsive element 54, a bellows 55 expands to shift the contact arm 48a into engagement with the resistance 48 and to change the effective value of the resistance 48 upon further movement. The circulation of defrosting fluid from the tank 34 is discontinued whenever the temperature is sufficiently high that additional heat for defrosting is not necessary; under this condition the resistance 48 is all in the circuit and the member 44 closes the outlet to the conduit 45.

During periods when the outdoor air temperature is low, additional capacity may be necessary in order to supply adequate heat for maintaining the temperature of the room 13 above a predetermined value, and in order to supply adequate heat under these conditions heated liquid may be admitted from the reservoir 34 to the intake of the pump 30. This additional liquid flows through a conduit 56 whenever a member 57 of the valve 41 is raised by an armature 58 upon energization of a solenoid 59. The solenoid 59 is energized whenever the temperature at the outlet of the pump 30 is below a predetermined value, the circuit being closed through a variable resistance 62. At this temperature a thermal element 60 of a control bellows 61 causes the bellows to contract and move an arm 62a into contact with and then over the resistance 62 to cut out a portion of the resistance 62 and energize the solenoid 59 sufficiently to open the valve 41 an amount depending upon the temperature at the element 60. Hot liquid is delivered from the outlet of the pump 38 through the valve 40 to the inlet of the pump 30 to supply additional heat sufficient to maintain the desired temperature of the liquid flowing to the evaporator 25. The additional liquid is returned to the reservoir 34 through the conduit 42. This additional supply of heat may be obtained at all times except during the defrosting operation when the slide 44 is actuated to close the passage between the valves 40 and 41. A check valve 63 is provided between the discharge end of the conduit 56 and the outlet of the heat exchanger 18 in order to prevent flow of hot liquid directly to the outdoor heat exchanger.

The liquid-circulating pumps 20, 30 and 38 are driven by suitable motors (not shown) and may be controlled in any desired manner for obtaining the required system performance.

It will thus be apparent that by providing the secondary circuit for conducting heat transfer liquid in heat exchange relationship with the evaporator 25 and the air flowing over the heat exchanger 18 and by suitable connections with the heat storage reservoir 34, this system makes it possible to defrost the evaporator without interrupting operation of the heat pump 17; thus, it is not necessary to interrupt the supply of heat to the room heat exchanger 14 during the defrosting operation. Furthermore, the system is arranged to provide an additional source of heat whenever outdoor temperatures are below a predetermined value.

In cold climates the operation of the system of Fig. 1 during low temperature outdoor air conditions may be such that the addition of heat from the storage tank results in raising the temperature of the liquid flowing from the heat exchange unit 29 to the outdoor unit 18 to a value higher than that of the outdoor air and consequently a reverse flow of heat takes place. For installations intended for operation at these low temperatures a somewhat different arrangement is preferred, as illustrated in Fig. 2. The system of Fig. 2 is, for the most part, the same as that of Fig. 1 and corresponding parts have been designated by the same numerals. The system of Fig. 2 differs from that of Fig. 1 in that when there is a requirement for additional heating to be supplied from the storage tank 34 the heat transfer liquid is circulated from the tank 34 to the house circulating system including the heating unit 14 and the heat exchanger 19 surrounding the condenser. The requirement for this additional heating is determined in accordance with outdoor temperature and the temperature of the liquid circulated to the indoor heating element 14. When the outdoor temperature is below a predetermined value as determined by a thermostat 64, and the liquid circulating in the indoor circuit is below a predetermined value as determined by a feeler element 65, the thermostat 64 closes its contacts and a bellows 66 in communication with the feeler bulb 65 contracts to move an arm 67 to engage and adjust a resistance 67a. This connects a solenoid 68 across supply lines 69 through a portion of the resistance. The solenoid 68 actuates a valve 70 by lifting a member 70a an amount determined by the setting of the resistance and, if the system is not set for defrosting, that is, if the element 44 of the valve 40 is in its right-hand position, member 70a connects the discharge of the pump 30 with a conduit 71 to feed the required amount of hot heat transfer liquid into the supply conduit 15; a check valve 72 prevents backflow to the pump 20. Heat transfer liquid is returned from the discharge conduit 16 through a conduit 73 connected in communication with a conduit 42a to conduct the heat transfer liquid back to the tank 34. The connection 42a provides communication between the discharge line from the outdoor heat exchanger 18 and the intake side of the pump 30 and the tank 34, and is provided with a check valve 42b to prevent back flow of heat transfer liquid to the pump 30 and the outdoor circulating system. Thus hot heat transfer liquid is supplied directly to the room circulating system and is not added to the circulating system for conducting liquid over the evaporator 25. The evaporator then may be operated at any temperature sufficiently low to pump heat from the outdoor air at its low temperature, and this heat is pumped to the condenser 23. The motor 22 and the circulating pumps 20, 30 and 38 may be controlled in the same manner as corresponding elements of the system of Fig. 1; or they may be controlled in accordance with the temperature of the heat transfer liquid returned to the heat transfer unit 19 instead of in accordance with the liquid discharged therefrom, and for this purpose I provide a switch 74 actuated by a bellows 75 responsive to the temperature at a feeler element 76 in the return line 16.

The normal circulation of heat transfer liquid through the tank 34 is effected in the same manner as in Fig. 1, the pump 38 producing a flow of the liquid through the valve 40 in the right-hand position of the element 44, the valve 70 in the lower position of the element 70a, and the return conduit 42a. The defrosting control has been shown as slightly modified over that of Fig. 1 in that the time switch motor is energized only when the thermostat 49 is closed, the thermostat being in the motor circuit instead of in the circuit of the resistance 48. The control effected by the resistance 48 and time switch 50 is, however, the same in both modifications. When there is a demand for defrosting, as determined by the thermostat 49 and the temperature responsive element 54 for operating the resistance 48, the defrosting control operates in the same manner as in Fig. 1, moving the element 44 to its left-hand position so that the pump 38 circulates hot liquid from the tank 34 to the heat exchanger 18 and then through the discharge conduit of the exchanger 18 to the conduit 42a which provides a return path to the heat storage tank 34. Thus a by-pass is provided so that the entire flow of liquid during the defrosting operation is not required to pass through the evaporator heat exchanger 29 and shock to the evaporator is less.

The system of Fig. 2 operates in the same manner as that of Fig. 1 to permit defrosting of the outdoor heat exchanger 18 without requiring stopping of the operation of the heat pump 17. It also provides the desired additional heat supply from the reservoir 34 to meet peak demands during low temperature outdoor conditions.

While I have illustrated my invention as applied to heat pumps for supplying heat to the room of a building, other applications will readily be apparent to those skilled in the art. I do not, therefore, desire my invention to be limited to the particular arrangements illustrated and described, and I intend by the appended claims to cover all modifications within the spirit and scope of my invention.

What I claim as new and desire to secure by Letters Patent of the United States is:

1. A refrigerating system including a refrigerant condensing unit and an evaporator connected in a closed refrigerant circuit, an air-to-liquid heat exchanger, means for circulating a heat transfer liquid over said evaporator and through said heat exchanger in series, means for circulating air over said exchanger to supply heat to said evaporator, a storage tank for heat transfer liquid, means for heating the liquid in said tank, and means arranged to connect said tank to said liquid circulating means for circulating liquid from said tank through said exchanger to raise the temperature of said exchanger and melt frost accumulated on the outer surface thereof.

2. A refrigerating system including a refrigerant condensing unit and an evaporator connected in a closed refrigerant circuit, a heat exchanger for receiving heat from a fluid source, circulating means for conducting heat transfer liquid over said evaporator and through said heat exchanger in series, a storage tank for heat transfer liquid, means for heating the liquid in said tank, means including a pump for agitating the liquid in said tank, means arranged to connect said tank to said circulating means and utilizing said pump for interchanging liquid between said tank and said circulating means, and means dependent upon a condition of operation of said system for actuating said liquid interchanging means to effect a transfer of heat from said tank to said circulating means.

3. A refrigerating system including a refrigerant condensing unit and an evaporator connected in a closed refrigerant circuit, an air-to-liquid heat exchanger, means for circulating a heat transfer liquid over said evaporator and through said heat exchanger in series, means for circulating air over said exchanger to supply heat to said evaporator, a storage tank for heat transfer liquid, means for heating the liquid in said tank, means arranged to connect said tank to said liquid circulating means for circulating liquid from said tank through said exchanger to raise the temperature of said exchanger and melt frost accumulated on the outer surface thereof, and means responsive to the temperature of liquid circulated over said evaporator for connecting said tank and said liquid circulating means to supply heat to said evaporator when the temperature of the liquid circulated over said evaporator reaches a predetermined minimum value.

4. A refrigerating system including a refrigerant condensing unit and an evaporator connected in a closed refrigerant circuit, a heat exchanger for receiving heat from a fluid source, circulating means for conducting heat transfer liquid over said evaporator and through said heat exchanger in series, a storage tank for heat transfer liquid, means for heating the liquid in said tank, means including a pump for producing a flow of liquid through said tank to maintain a substantially uniform temperature therein, means arranged to connect said tank to said circulating means and utilizing said pump for interchanging liquid between said tank and said circulating means, and means responsive to the temperature of liquid in said circulating means for actuating said liquid interchanging means to effect a transfer of heat from said tank to said circulating means upon a decrease in the temperature of the liquid in said circulating means to a predetermined minimum value.

5. A referigerating system including a refrigerant condensing unit and an evaporator connected in a closed refrigerant circuit, an air-to-liquid heat exchanger, means for circulating a heat transfer liquid over said evaporator and through said heat exchanger in series, means for circulating air over said exchanger to supply heat to said evaporator, a storage tank for heat transfer liquid, means for heating the liquid in said tank, normally inoperative control means arranged to connect said tank to said liquid circulating means for circulating liquid from said tank through said exchanger to raise the temperature of said exchanger and melt frost accumulated on the outer surface thereof, means for periodically conditioning said defrosting means for operation, and means responsive to the temperature of the air circulated over said heat exchanger for energizing said defrosting means under control of said periodic conditioning means.

6. A refrigerating system including a refrigerant condensing unit and an evaporator connected in a closed refrigerant circuit, a first heat exchanger for receiving heat from the ambient air, first circulating means for conducting heat transfer liquid over said evaporator and through said heat exchanger in series, a storage tank for heat transfer liquid, means for heating the liquid in said tank, means including a pump for moving the liquid through said tank, a second heat exchanger, a second circulating means for conducting heat transfer liquid over a portion of said condensing unit and through said second heat exchanger in series, means arranged to connect said tank to said second circulating means and utilizing said pump for interchanging liquid between said tank and said second circulating means, and means dependent upon a predetermined minimum temperature of the liquid circulated over said second heat exchanger for actuating said liquid interchanging means to effect a transfer of heat from said tank to said second heat exchanger.

7. A refrigerating system including a refrigerant condensing unit and an evaporator connected in a closed refrigerant circuit, a first heat exchanger for receiving heat from the ambient air, first circulating means for conducting heat transfer liquid over said evaporator and through said heat exchanger in series, a storage tank for heat transfer liquid, means for heating the liquid in said tank, a second heat exchanger means including a pump for moving the liquid through said tank, a second circulating means for conducting heat transfer liquid over a portion of said condensing unit and through said second heat exchanger in series, means arranged to connect said tank to said second circulating means and utilizing said pump for interchanging liquid between said tank and said second circulating means, means dependent upon a predetermined minimum temperature of the liquid circulated over said second heat exchanger for actuating said liquid interchanging means to effect a transfer of heat from said tank to said second heat exchanger, and means dependent upon a condition of operation of said first heat exchanger for circulating liquid from said tank through said first heat exchanger to raise the temperature of said first heat exchanger and melt frost accumulated on the outer surface thereof.

8. A refrigerating system including a refrigerant condensing unit and an evaporator connected in a closed refrigerant circuit, a first heat exchanger for receiving heat from the ambient air, first circulating means for conducting heat transfer liquid over said evaporator and through said heat exchanger in series, a storage tank for heat transfer liquid, means for heating the liquid in said tank, means including a pump for moving the liquid through said tank, a second heat exchanger, a second circulating means for conducting heat transfer liquid over a portion of said condensing unit and through said second heat exchanger in series, means arranged to connect said tank to said second circulating means and utilizing said pump for interchanging liquid between said tank and said second circulating means, and means dependent upon the concurrence of a predetermined minimum temperature of the liquid circulated over said second heat exchanger and a predetermined minimum temperature of the air circulated over said first heat exchanger for actuating said liquid interchanging means to effect a transfer of heat from said tank to said second heat exchanger.

9. A refrigerating system including a refrigerant condensing unit and an evaporator connected in a closed refrigerant circuit, an air-to-liquid heat exchanger, means for circulating a heat transfer liquid over said evaporator and through said heat exchanger in series, means for circulating air over said exchanger to supply heat to said evaporator, a storage tank for heat transfer liquid, means for heating the liquid in said tank, and defrosting means responsive to a predetermined low temperature of the air circulated over said heat exchanger and arranged to connect said tank to said liquid circulating means for circulating liquid from said tank through said exchanger to raise the temperature of said exchanger and melt frost accumulated on the outer surface thereof.

10. A refrigerating system including a refrigerant condensing unit and an evaporator connected in a closed refrigerant circuit, an air-to-liquid heat exchanger, means for circulating a heat transfer liquid over said evaporator and through said heat exchanger in series, means for circulating air over said exchanger to supply heat to said evaporator, a storage tank for heat transfer liquid, means for heating the liquid in said tank, means arranged to supply liquid from said tank to said liquid circulating means for defrosting said heat exchanger and means responsive to the temperature of the liquid admitted to said heat exchanger and controlling the flow of liquid from said tank for limiting to a predetermined maximum value the rise in temperature of the liquid admitted to said heat exchanger upon operation of said defrosting means.

COY W. BROWN.

REFERENCES CITED

The following references are of record in the file of this patent:

Article in July 1945, issue of "Heating and Ventilating," entitled "Heat pump defrosting cycle," by Philip Sporn and E. R. Ambrose (pages 55 through 61).